Figure 1:
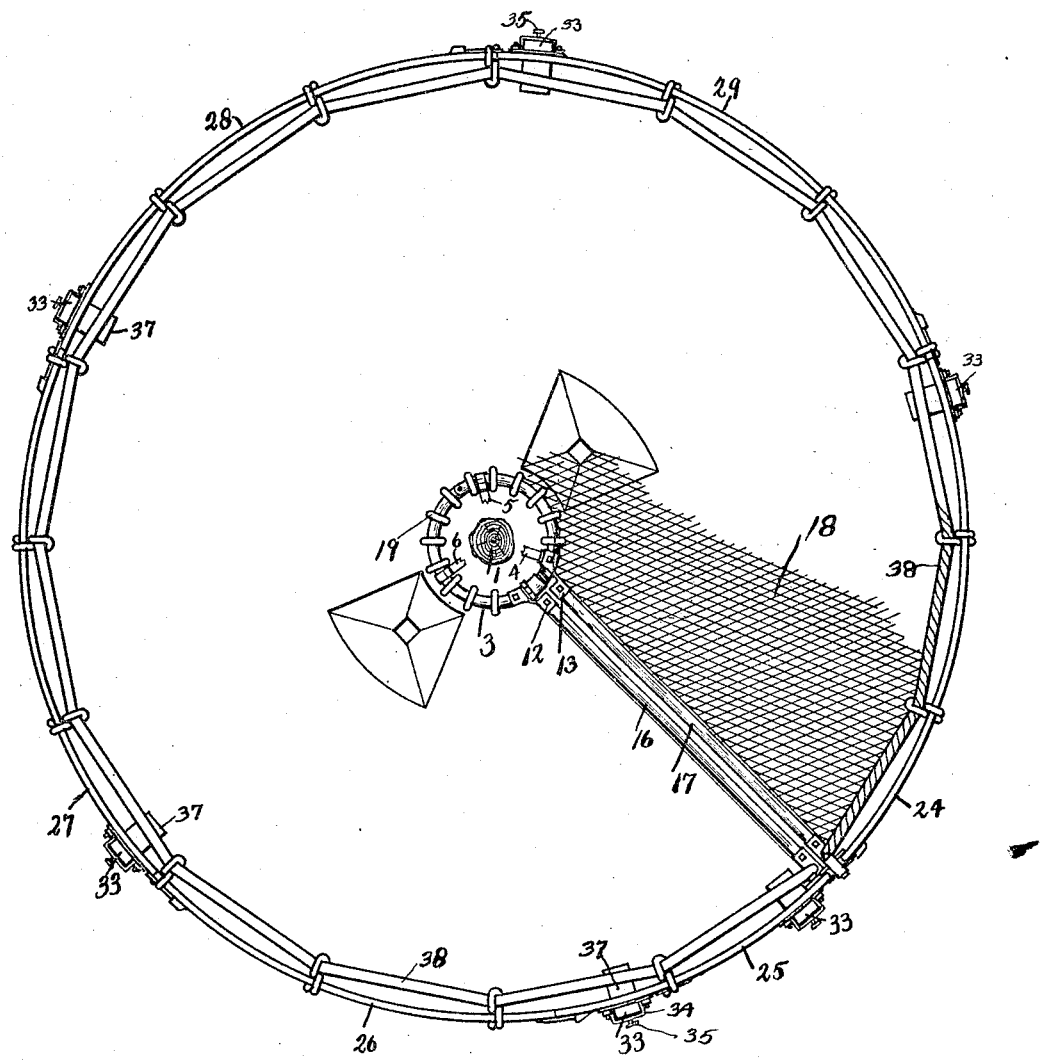

L. M. FLECKNER.
FRUIT PICKING NET.
APPLICATION FILED FEB. 7, 1917.

1,286,980.

Patented Dec. 10, 1918.
3 SHEETS—SHEET 1.

L. M. FLECKNER INVENTOR.

BY
Carlos P. Griffin
ATTORNEY.

L. M. FLECKNER.
FRUIT PICKING NET.
APPLICATION FILED FEB. 7, 1917.

1,286,980.

Patented Dec. 10, 1918.
3 SHEETS—SHEET 2.

L. M. FLECKNER INVENTOR.

BY
Carlos P. Griffin
ATTORNEY.

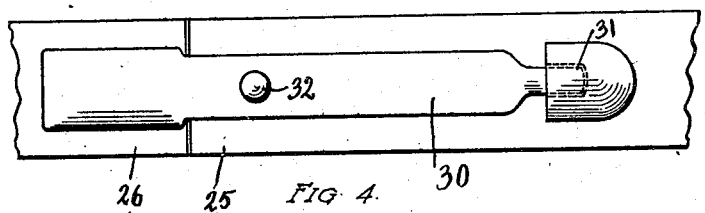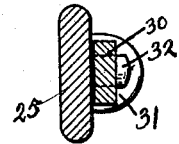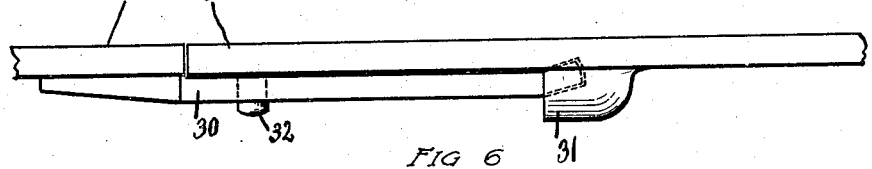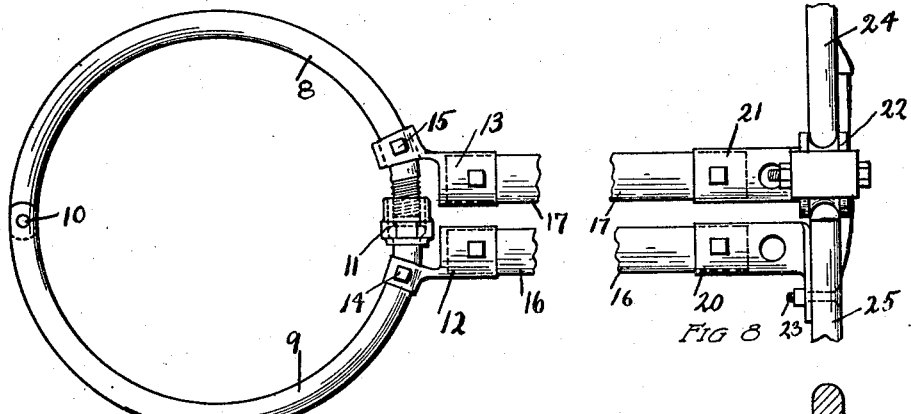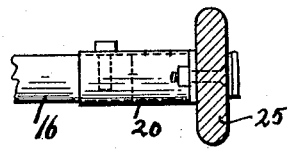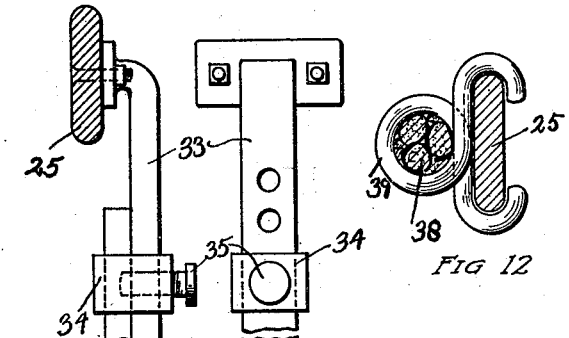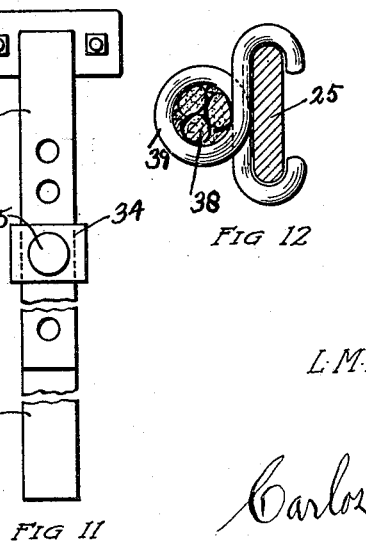

UNITED STATES PATENT OFFICE.

LUTHER M. FLECKNER, OF CLOVERDALE, CALIFORNIA.

FRUIT-PICKING NET.

1,286,980.     Specification of Letters Patent.     Patented Dec. 10, 1918.

Application filed February 7, 1917. Serial No. 147,094.

*To all whom it may concern:*

Be it known that I, LUTHER M. FLECKNER, a citizen of the United States, residing at Cloverdale, in the county of Sonoma, State of California, have invented a new and useful Fruit-Picking Net, of which the following is a specification in such full and clear terms as will enable those skilled in the art to construct and use the same.

This invention relates to a net for picking fruit, and its object is to provide means whereby the fruit may be shaken off the tree without bruising it, while at the same time the leaves are separated from the fruit.

Another object of the invention is to provide means for carrying and holding the net when moving from tree to tree.

Another object of the invention is to provide means whereby the net may be quickly spread out and gathered up to make a move.

Another object of the invention is to provide means for setting the net level when it is being used on a side hill.

Another object of the invention is to provide means whereby the net may be connected to the outer support therefor and spread out or gathered up without interfering with the legs which carry the outer supporting ring.

Other objects of the invention will appear as the description proceeds.

An embodiment of the invention is shown in the drawings in which the same reference numeral is applied to the same portion throughout, but I am aware that there may be many modifications thereof.

Figure 2:
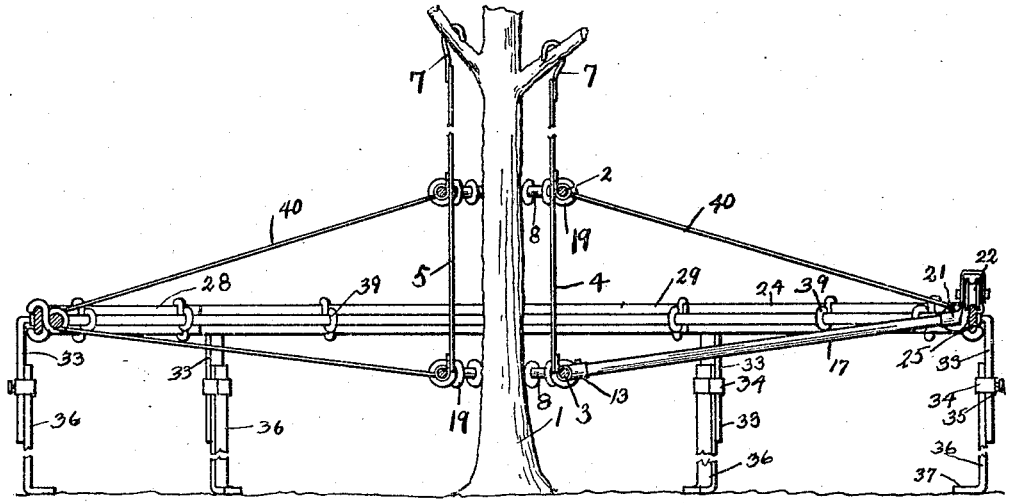
Figure 3:
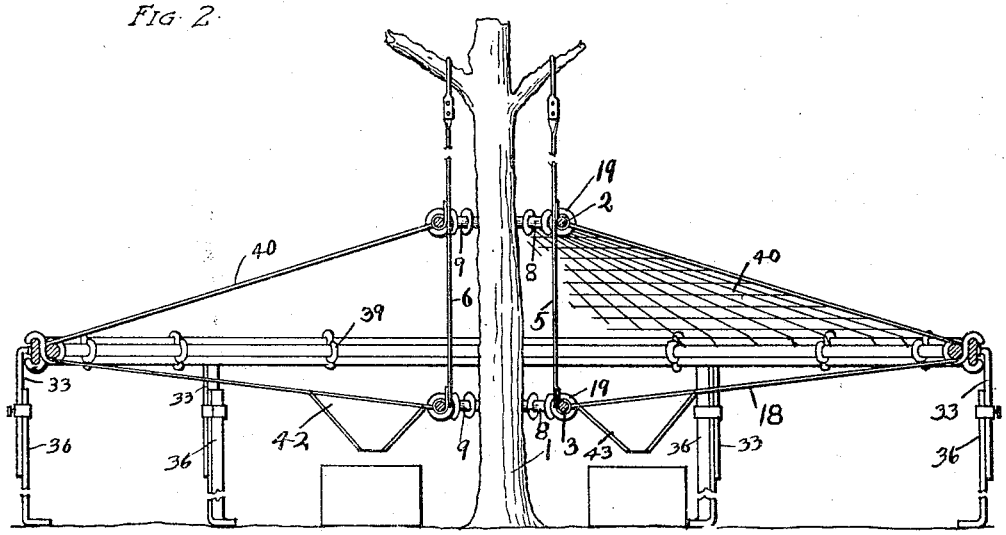

Figure 1 is a plan of the complete apparatus with the upper net removed,

Fig. 2 is a vertical sectional view of the net along the line of one of the spreading rods Fig. 1, Fig. 3 is a vertical sectional view of the net substantially at right angles to the line of section Fig. 2, only portions of the nets showing in the said views, Fig. 4 is a side elevation of one of the rim joints, Fig. 5 is a sectional view illustrating one of the rim joints, Fig. 6 is a plan view of one of the rim joints, Fig. 7 is a plan view of the lower net ring which passes around the tree trunk, Fig. 8 is a plan view of the outer rim adjacent the ends of the two poles supporting the net edges, Fig. 9 is a vertical sectional view of the outer rim adjacent the end of the fixed pole, Fig. 10 is a view in edge elevation of one of the rim supporting legs, the rim showing in section, Fig. 11 is a side elevation of one of the supporting legs, Fig. 12 is a sectional view of the outer rim showing one of the net holders thereon, and Fig. 13 is a vertical sectional view of the outer rim showing the movable pole and roller on the end thereof.

The numeral 1 represents the tree which supports two rings 2 and 3 by means of the straps 4, 5 and 6, which are loosely connected with said rings, and which have hooks as illustrated at 7 for connecting the straps to the tree.

The rings are formed of two half circles 8 and 9, jointed at 10 and connected together at their other ends with the threaded sleeve 11. Mounted in two brackets 12 and 13 are two rods 16—17 which support the adjacent edges of the net 18. The brackets 12 and 13 are loosely mounted on the ring 3 and when desired they may be secured in a fixed position by means of the set screws 14, 15. The rings 2 and 3 have a plurality of curtain rings 19 loosely mounted thereon, to which rings the inner edge of the nets may be secured.

The outer ends of the rods 16, 17 are connected to two brackets 20—21 respectively, the latter having a roller 22 which rides on the rim segment 24, while the former is secured to the rim segment 25 by means of a bolt 23.

The rims to which the outer edge of the nets are connected consists of the segments 24 to 29 inclusive which make up the complete circle and which are detachably connected together at their ends. When the segments are connected they make a complete circle.

Each segment has a projecting tongue 30 which takes in a detent 31 of the next adjacent section and a pin 32 assists in holding the rim sections together when once connected.

The several rim sections have legs 33 connected therewith, the section 25 having two legs and the section 26 none. The legs 33 are adjustable in height by means of the slidable legs 36 having feet 37 at their lower ends, and to which they are fixed in a given adjustment by means of the clamp 34 and set screw 35, there being one clamp and set screw for each pair of legs. The legs 33 are connected to the rim section 25 at opposite ends thereof while the sections 27, 28, 29 and 24 have the legs 33 connected therewith adjacent one end only, there being one leg for each section.

The object of the foregoing construction is to permit the net which has been assembled upon the section 25 to be readily set up by hanging the net from the poles on the tree at the ring 3, while the two legs 33 support the section 25 at the proper height, thereupon the sections 24, 29, 28, 27 and 26 may be connected together in the order given.

The outer edge of the net 18 is connected to a rope which is in turn connected by means of a plurality of double hooks 39 to the outer supporting rims, consisting of the sections 24 to 29 inclusive.

The upper rings 19 support a wide mesh net 40 which is also connected to the rope 38, the object being to provide means to separate the leaves and broken branches from the fruit which is heavy enough to pass therethrough easily.

The double hooks are loosely slidable on the rim and the entire series may be moved around and brought together on the section 25, whereupon the two poles and the loose loops of the nets may be secured together for moving to another tree.

The operation of the apparatus is as follows:—Assuming the nets to be secured to the two poles and the double hooks all on the rim section 25 the apparatus will be set with the legs at a suitable height adjacent a tree, the rings will then be secured together around the tree trunk and the strap 4 will be connected with the branches to hold the rings at the proper height. The several rim sections are then fitted together their legs being adjusted to a convenient height, whereupon the movable rod 17 will be rolled around the rim, and as the rings 19 are spread out the other straps 5 and 6 may be connected with the tree branches. The apparatus is then ready to collect the fruit which is shaken off the tree with long poles. As the lower net is provided with two outlet chutes 42 and 43, the fruit passes out into boxes placed below the net and is ready to be sent to the packing house or dry yards.

The space at the center of the net around the tree trunk may be covered with a separate net or canvas, not a part of the invention and therefore unecessary to illustrate.

Having thus described my invention what I claim as new and desire to secure by Letters Patent of the United States, is as follows:—

1. A fruit picking apparatus comprising a jointed ring of a size to closely surround the trunk of a tree, means to support said ring, a larger ring in several connected sections surrounding the tree at a distance therefrom, means to support the latter ring, a circular net having two radially extending edges and forming a fruit receptacle and guideway, means to connect the net to the two rings, a fixed rod connecting the inner and outer rings, a movable rod extending from one ring to the other, the radially extending edges of the net being connected to said rod, and hooks slidable around the outer ring for the support of the outer edges of the net, and to allow the net to be assembled with the hooks all upon one section of the outer ring.

2. A fruit picking apparatus comprising a pair of rings of a size to surround a tree trunk, means to support said rings at different elevations, another ring surrounding the tree trunk at a distance therefrom, and a pair of nets connecting the outer ring and the two inner rings, the upper net having a coarser mesh than the lower net and acting as a guard for said lower net.

3. A fruit picking apparatus comprising a jointed ring of a size to closely surround a tree trunk, means to support said ring, a second ring in sections, adjustable legs for supporting said second ring at a suitable elevation, a series of slidable rings on the first ring, and a series of hooks on the second ring, a net connected with said slidable rings and hooks, a fixed rod connecting the outer ring with the inner ring to which one edge of the net is connected, and a movable rod to which the other edge of the net is connected, the latter rod adapted to be used in pushing all of the net close to the fixed rod for packing the apparatus.

In testimony whereof I have hereunto set my hand this 24th day of January A. D. 1917.

LUTHER M. FLECKNER.